RECORD FILLING MEANS

Filed Aug. 31, 1964 2 Sheets-Sheet 1

INVENTOR.
LOUIS E. FREY
BY
Wilderson and Stoffel
ATTORNEYS

INVENTOR.
LOUIS E. FREY

BY

Widdowson and Stoffel
ATTORNEY

3,258,126
RECORD FILLING MEANS

Louis E. Frey, 382 Fairway, Wichita, Kans.
Filed Aug. 31, 1964, Ser. No. 393,243
9 Claims. (Cl. 211—40)

This invention relates to record storage, more particularly to a storage holder for disc type phonograph records. Still more specifically, this invention relates to a rack adapted to support a plurality of phonograph records in record album jackets supported on the rack.

The acquisition of a number of phonograph records often presents the owner thereof with problems as to storage, indexing, etc. When the number of records is very large the problems are compounded. It is desirable that all of the records in a collection be instantly available so that they can be played and enjoyed. It is desirable also that the records be indexed so that any desired record can be quickly and conveniently located and removed, and later can be quickly returned to the proper indexed location after use. The record jacket or album should also be retained for easy future reference so that specific details as to the titles of the various selections, instrumetations, history, etc., can be determined if desired.

It is believed apparent that the usual record storage in a cabinet or in a rack, or the like, however orderly and systematic the arrangement, is not the ideal method of achieving the above mentioned objectives. This is particularly true if there are a number of people who use a common collection of records. The usual means for storing records known to the prior art is tedious and difficult to maintain in an orderly arrangement. Further, records not properly stored can become scratched and otherwise damaged. This seriously detracts from their value and the future enjoyment derived therefrom. The various storage means for records known to the prior art do not provide a convenient and satisfactory means of indexing and storing records, and safe guarding same from damage. Further, the known storage means often do not preserve the record jackets or albums for future reference where they can be readily located. The known cabinets for storing records are very often expensive and take up much space in a room. Moreover, often the record cabinets become out-moded when the style of the rest of the furniture is changed, and therefore look out of place.

I have invented a new storage means for phonograph records and the like. In combination with the usual records and envelopes or jackets therefor, the new storage means of my invention includes, a record having identifying indicia thereon, a record envelope or jacket having indicia thereon corresponding to the indicia on the record, and a means to support the envelope or jacket in an upright position. The means to support the jacket or envelope in an upright position has means engaging the envelope or jacket to support same.

The new record and enclosure means holder of my invention which receives and mounts the jacket or envelope for the record in position to receive and store same, has a vertically spaced and horizontally extending member. Means is employed to support this member. The holder has an abutment means located relative to the member. The resulting holder is constructed and adapted to receive and support phonograph records or the like in enclosures or jackets for same when the enclosures or jackets are mounted on the member.

The record storage and holder and various combinations thereof of my invention solves all of the problems known to storage means for records of the prior art. My new record storage holder provides a very simple and dependable means for indexing records so that they can be instantly located and removed from the record jackets when desired. Further, the holder or rack is so arranged and constructed that the storage enclosure for any record can be conveniently located after the record has been used and it is desired to again store it. The record jackets or albums are securely held in the rack in a semi-permanent upright position. The supporting arrangement is very efficient allowing the jackets to occupy only the actual thickness. This allows many records to be stored in a relatively small space. The records stored in my new storage rack are protected from damage, scratching, etc., and are stored in a vertical position where they are unlikely to warp. Another advantage of my storage rack is that the record jacket or enclosure envelope for each record is preserved and can be readily located for later reference as to information contained thereon if necessary or desirable. The album record storage rack of my invention is light in weight, attractive in appearance, and can be produced quite inexpensively.

It is an object of this invention to provide new storage means for phonograph records and the like.

Another object of this invention is to provide a new phonograph record and storage album rack that holds the records in an upright position in album jackets or enclosures supported in an upright position.

Still another object of my invention is to provide a new record holder means that is provided with an indexing means making possible the immediate location of any desired record supported therein.

Still another object of my invention is to provide a record storage holder which in use prevents damage, scratching, warping, etc., of the records stored therein.

Another object of my invention is to provide a new record storage holder that preserves the album jacket or envelope for possible future reference in a convenient and readily accessible location.

Still another object of my invention is to provide a record storage holder that is attractive in appearance.

Still another object of my invention is to provide a new record storage holder that is light in weight.

Another object of my invention is to provide a new record storage holder that can be inexpensively produced.

Other objects and advantages of the new record storage holder of my invention will become apparent to those skilled in the art upon reading the disclosure. Drawings accompany and are a part of this disclosure. These drawings depict preferred specific embodiments of the new record storage holder of my invention and it is to be understood that such drawings are not to unduly limit the scope of my invention. In the drawings, FIG. 1 is a perspective view of a preferred specific embodiment of the new record storage holder of my invention with jackets and records therewith.

Figure 1:
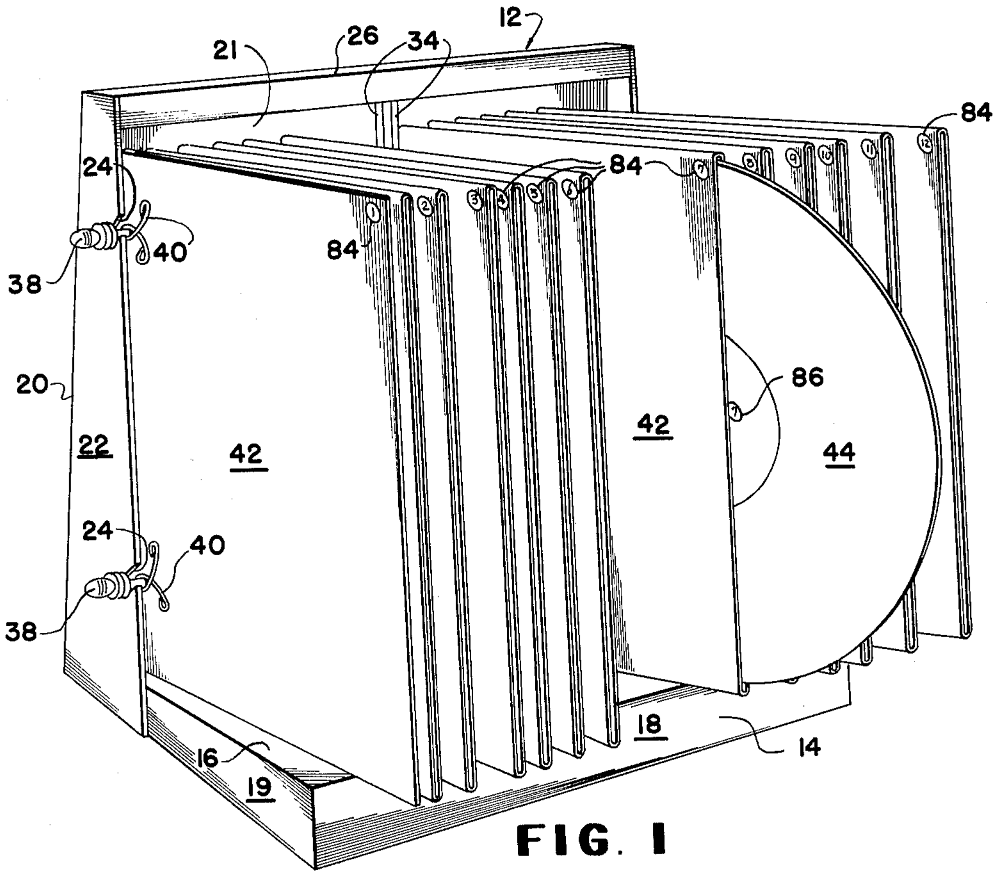

The following is a discussion and description of the new record and holder means, and combination thereof, of my invention made with reference to the drawings, wherein the same reference numerals are used to indicate the same or similar parts and/or structure. The discussion and description is of preferred specific embodiments of the new record and storage holder, and combinations thereof, of my invention, and it is to be understood that such is not to unduly limit the scope of my invention.

Figure 2:
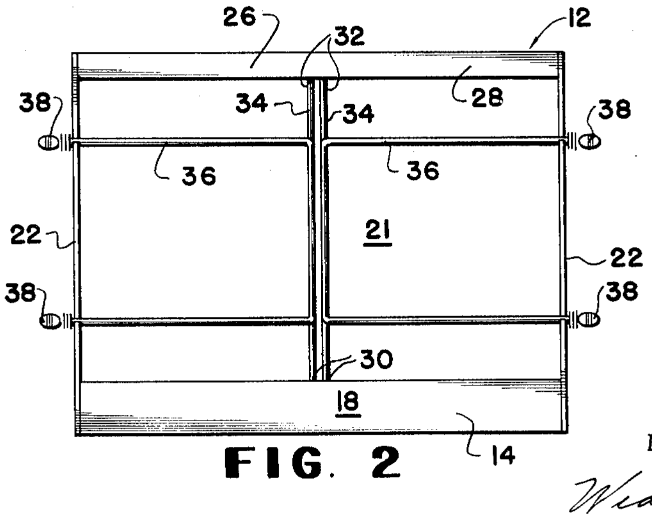
FIG. 2 is a front elevational view of the record storage and holder of my invention with the album envelopes and records removed.
Figure 3:
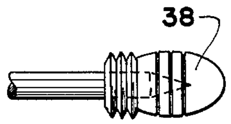
FIG. 3 is a detail view in enlarged scale of a preferred finial fixture mounted on the ends of the support rods.
Figure 4:
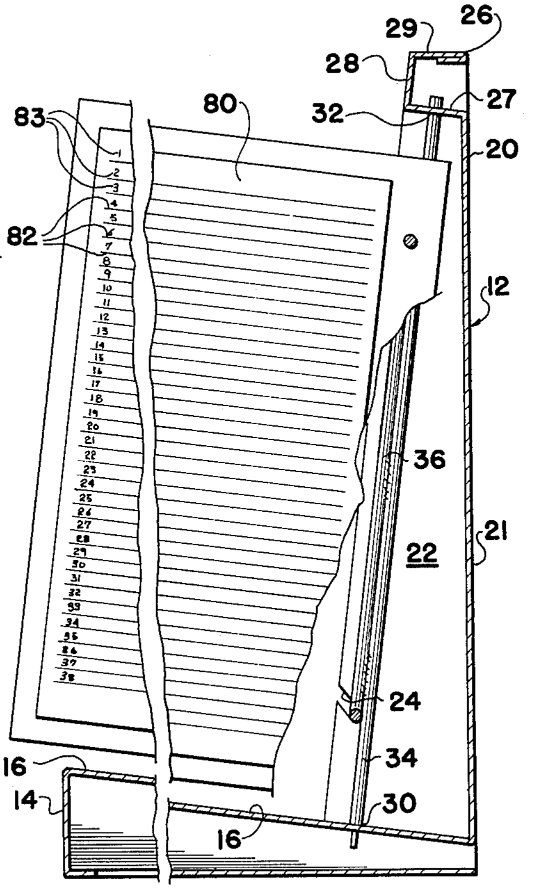
FIG. 4 is a side elevational view in broken section of the storage and holder rack of my invention.

Referring now to the drawings, FIGS. 1–10, there is depicted a preferred specific embodiment of the phonograph record and album storage rack 12 of my invention. The storage rack 12 of my invention has a rectangular shaped base 14, having a flat rearwardly sloping top 16, and front and side portions 18 and 19, respectively. The base 14 is preferably formed from a single sheet of metal, or other suitable material. An upright support 20 is joined to the rear of base 14. The upright support 20 has a flat backing plate 21, and two opposed upright side sections 22 joined at the rear edges to the back plate. The side sections 22 each have a rearwardly inclined front edge with two vertically spaced downwardly slanted slots 24. Preferably, the front edges of the upright sections 22 are perpendicular to the top surface 16 of base 14. A top header 26 is provided on the upright support. The top header 26 has a flat lower generally horizontal portion 27 joined at the rear edge to the top edge of back plate 21, a flat relatively narrow generally vertically extending portion 28 joined at the lower edge to the front edge of lower portion 27, and a flat generally horizontal top portion 29 joined at the front edge to the top edge of the vertically extending portion 28. This relationship is most clearly illustrated in FIG. 4 of the drawings. Two sets of spaced apertures are provided in the base 14 and header 26. In FIG. 4 is illustrated the positioning of these apertures, namely apertures 30 in the bottom plate 16 of the base, and apertures 32 in the upper flat portion 27 of header 26. Two upright shafts 34, each having a shoulder on the lower end portion, are mounted in apertures 30 and 32, previously described. As indicated in FIG. 4 the shafts 34 are inclined rearwardly and are perpendicular to the upper surface 16 of base 14. Two U-shaped members 36 are secured to the respective upright shafts 34. The positions of the U-shaped members 36 with respect to the upright support 20 and shafts 34 is illustrated in FIG. 2. The ends of the legs of the U-shaped members 36 are disposed in the downwardly inclined slots 24 in side sections 22. It can be appreciated that the U-shaped members 36 attached to shafts 34 can be pivoted about the upright inclined axis of shafts 34 and selectively positioned in the slots 34. Four finial fittings 38 are frictionally mounted on the ends of U-shaped members 36. The preferred structure and design for the finial fitting 38 is illustrated in FIG. 3 of the drawings. Four movable abutment fittings 40 are mounted on the legs of the U-shaped members 36. However, one on each side has been found to be satisfactory. Each of the abutment fittings 40 have a coil spring portion, having one or more coils, snugly engaging the rod-like leg of element 36, two extending lever portions depending from the ends of the coil spring portion, and circular loops on the ends of the extending lever portions. This structure is illustrated in FIG. 1 of the drawings. In order to move the abutment fitting 40, the circular loops on the lever portions are squeezed together thus slightly enlarging the inner circumference of the coil spring allowing the fitting to be moved.

The storage rack of my invention is adapted to support record albums 42 opened to the front on the legs of the U-shaped members 36. Before mounting the record albums 42 two spaced holes are preferably punched in the rear edge thereof. The spacing of the holes in the record albums 42 is the same as the spacing of the legs of the U-shaped member 36 supported on shafts 34. Since the record albums or enclosure envelopes, normally containing the records when they are purchased, are made of a relatively strong material. I have found that punched holes work very well. Records 44 can be inserted into the open end of the albums 42, as indicated in FIG. 1. The U-shaped members 36 that support the albums 42, preferably hold same in an inclined position to prevent inadvertent rolling out of the records 44. This is automatically taken care of by inclining the shafts 34. As indicated in 42 the record albums are held at a slight angle relative to the horizontal and which angle preferably corresponds to the top plate 16 of the base 14.

Figure 5:
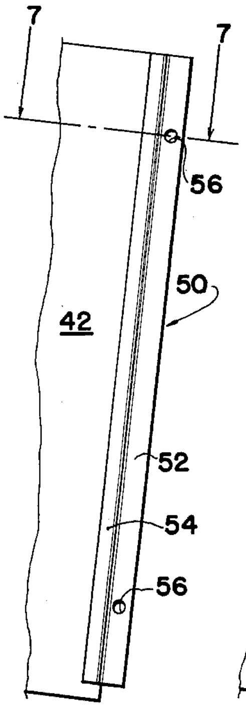
FIG. 5 is a front elevational view of a preferred specific embodiment of my invention of a hanger means attached to a record album.
Figure 7:
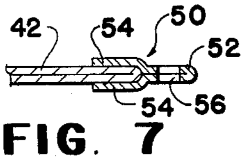
FIG. 7 is a cross sectional view taken on line 7—7 of FIG. 5.

FIGS. 5 and 7 illustrate a preferred specific embodiment 50 of a means to mount the album or record enclosure means on the rack of my invention. The means or element 50 to support a record album includes an elongated member, preferably made of metal, which has a folded central portion 52 which is terminated in two spaced longitudinally extending flap portions 54. When the element 50 is made of metal, the flap portions 54 are preferably provided with relatively small sharp protrusions on the inside surfaces thereof. The elements 50 can then be secured to the proper edge of an album or record enclosure by merely bending the flap portions 54 together over the edge of the album with the pointed protrusions penetrating and locking it to the album. The element 50 is provided with apertures 56 in the folded portion to receive the legs of the U-shaped member 36. If desired, the element 50 can be made of plastic, paper, or the like or combinations thereof, and glued, clipped or otherwise secured to the albums.

Figure 6:
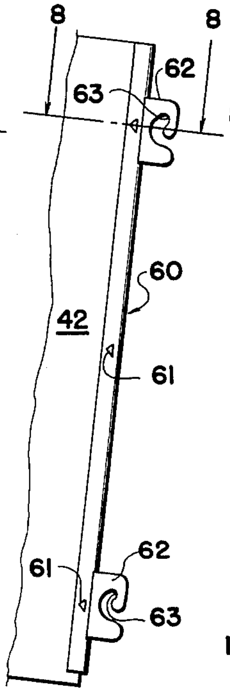
FIG. 6 is a front elevational view of still another preferred specific embodiment of a hanger means of my invention attached to a record album.
Figures 8, 9:
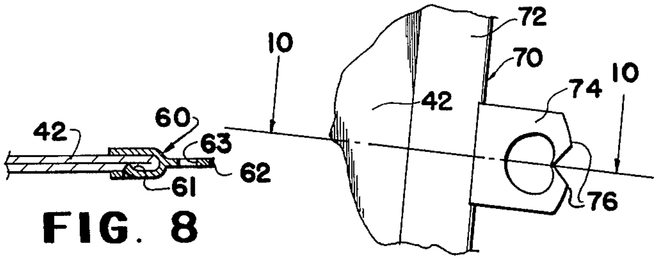
FIG. 8 is a cross sectional view taken on line 8—8 of FIG. 6.
FIG. 9 is a fragmentary view of still another preferred embodiment of a hanger means of my invention shown attached to a record album.

FIGS. 6 and 8 illustrate still another specific embodiment 60 of a means for securing the album or enclosure envelope to the U-shaped member 36 of my storage rack. The means or element 60 has an elongated portion having a transverse U-shaped cross section. The element 60 can be made out of metal and be provided with inwardly directed hooks or barbs 61 on the inner surfaces of the legs of the elongated U-shaped portion. Spaced hangers 62 are mounted on the elongated portion. The hangers are preferably rectangular shaped having an upwardly directed hooked shaped slot 63 therein. The element for means 60 is adapted to be secured to the edge of an album or record enclosure by bending the legs of the U-shaped member together in engagement with the edge of the enclosure. However, the member can be made of flexible material and be provided with adhesive surface on the inner sides of the legs of the member to be adhered to the record enclosure, if desired. The hanger means 60 can be attached to the rack by merely placing the horizontal rods in the slots 63 and lowering the album. There is no necessity that the horizontal rods or legs be pivotally secured to the base and header.

Figure 10:
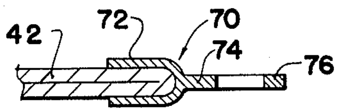
FIG. 10 is a cross sectional view taken on line 10—10 of FIG. 9.

FIGS. 9 and 10 illustrate still another specific embodiment 70 of the means for mounting the record enclosure 42 on the record storage rack of my invention. The means 70 has an elongated portion 72 having a transverse U-shaped cross section, as indicated in FIG. 10. The U-shaped member 72 can be secured to the edge of a record album 42. The hanger elements 74 are mounted on, or can be an integral part of the elongated member 72. Hanger member 72, as indicated in FIG. 9, has an annular central aperture with two flexible legs 76. The legs 76 are sufficiently rigid to retain the record album on the legs of U-shaped member 36 of rack 12, but sufficiently flexible to permit entry of the member 36. In use, this hanger embodiment does not require that the horizontal bars or rods supporting the albums be made to pivot outwardly from the rack, since the hanger elements 74 can be directly attached by moving same transversely to the bar.

The record storage album rack of my invention is preferably provided with an indexing means to facilitate the location and orderly storage of the records contained therein. The indexing means includes a rectangular shaped sheet 80, preferably a cardboard sheet having spaced apertures with the leg members 36 positioned therein in supporting engagement, a plurality of line indicia 82, and numeral indicia 83, or other consecutive indicia thereon. At least two identical sets of gum labels having consecutive numbers, or other consecutive indicia, printed thereon are provided. In use one set of the numbered labels are adhered to the upper corner of the albums as indicated by numeral 84 in FIG. 1. The other set of gum labels is adhered to the records 44 as indicated by numeral 86 on FIG. 1. The sheet 80 can be adhered to the end record album if desired. Another suitable indexing system for use with my invention is to provide a sheet, book, etc., wherein the record titles are listed alphabetically and the numbers assigned to each album is indicated after each title. The numbers associated with record titles can be a third set of indicia labels if desired.

As will be appreciated to persons skilled in the art the rack 12 including the base and the upright support 20 formed from a single sheet of metal or other suitable material. The rack 12 can therefore be produced relatively inexpensively. However, the rack can be made of any suitable material such as wood, plastic, fibrous material, and the like, or combinations thereof. The entire assembly including the rack, photograph albums, etc., presents a very neat appearance and is relatively light in weight. The rack furthermore prevents the records properly contained therein from becoming scratched and otherwise damaged.

As will be obvious to those skilled in the art, various changes and modifications of the preferred record storage holder of my invention and elements thereof, as described herein can be made or followed without departing from the spirit of the disclosure or the scope of the claims.

I claim:

1. A photograph record and album storage rack comprising, in combination, a rectangular shaped base having a flat rearwardly sloping top and upright front and side portions formed from sheet metal, an upright support secured to the rear of said base having a flat backing plate, two opposed upright side sections joined at the rear edges to said back plate, at the bottom to the side portions of said base, and having rearwardly inclined front edges, two vertically spaced downwardly slanted slots in each of said front edges of said side sections, said front edges and the flat top of said base forming right angles, a top header having a flat lower horizontal portion joined at the rear edge to the top edge of said back plate, a flat relatively narrow vertically extending portion joined at the lower edge to the front edge of said flat lower portion, and a flat horizontal top portion joined at the front edge to the top edge of said vertically extending portion, said top plate of said base provided with two spaced apertures positioned centrally thereof in spaced relation to the rear edge, said lower flat portion of said top header provided with two spaced apertures positioned centrally thereof opposite said first mentioned spaced apertures, two upright shafts, each of said shafts having a lower reduced end portion having a shoulder, said shafts seated in the respective spaced apertures in said base and extending upwardly at right angles to said sloping top of said base and positioned in the apertures in said top header, two U-shaped members each secured at its base to one of said upright shafts with the legs selectively positionable in said slanted slots in said upright support, tapered ends on said U-shaped members, four finial fittings frictionally secured to said tapered ends, four movable abutment fittings mounted on the legs of said U-shaped members, each of said abutment fittings having a coil spring portion snugly engaging said leg, two extending lever portions, and circular loops on the ends of said extending level portions, a rectangular shaped cardboard sheet having spaced apertures with said legs of said U-shaped member positioned therein in supporting engagement, a plurality of line and numeral indicia on said sheet, and two identical sets of gummed labels having consecutive indicia printed thereon, said rack adapted in use to support record albums open to the front and having spaced punched apertures therein in the rear on the U-shaped members with the legs positioned in the punched apertures, and with said cardboard sheet and label serving as indexing means when one of said sets is attached to the respective albums supported on said rack and the other corresponding set attached to the respective records.

2. A phonograph record and album storage rack comprising, a rectangular shaped base having a flat rearwardly sloping top, an upright support means secured to the rear of said base having a flat backing plate, two opposed upright side sections joined at the rear edges to said back plate and having rearwardly inclined front edges, two vertically spaced downwardly slanted slots in each of said front edges of said side sections, a top header having a flat lower horizontal portion joined at the rear edge to the top edge of said back plate, a flat relatively narrow vertically extending portion joined at the lower edge to the front edge of said flat lower portion and a flat horizontal top portion joined at the front edge to the top edge of said vertically extending portion, said top plate of said base provided with two spaced apertures positioned in the center thereof in spaced relation to the rear edge, said lower flat portion of said top header provided with two spaced apertures positioned centrally thereof opposite said first mentioned spaced apertures in said base, two upright shafts, each of said shafts having an abutment adjacent the lower end, said shafts seated in the respective spaced apertures in the base and spaced apertures in the top header and positioned to incline rearwardly, two U-shaped members, each secured at its base portion to one of said upright shafts with the legs selectively positionable in said slanted slots in said upright support, movable abutment fittings secured to the legs of said U-shaped members, a rectangular sheet having spaced apertures therein in supported engagement on said rack with said legs of one of said U-shaped members positioned in supporting engagement in the spaced apertures, a plurality of line indicia on said sheet, two sets of gummed labels having identical consecutive indicia printed thereon, said rack adapted in use to support record albums having vertically spaced aperture means with the legs of said U-shaped members positioned in said aperture means, and records in the record albums, with said sheet and labels serving as indexing means when one of said sets is attached to the respective albums supported on said rack and the other corresponding set attached to the respective records.

3. A phonograph record and album storage rack comprising, a rectangular shaped base, an upright support secured to the rear of said base having a backing plate, two opposed upright side sections joined to said backing plate provided with two vertically spaced downwardly slanted slots in the front edges, a top header joined to said backing plate and said upright side sections, said header provided with two spaced apertures adjacent the center portion thereof, said base provided with two spaced apertures positioned in the center portion thereof, two upright shafts positioned in said spaced apertures in said header and in said base, a plurality of transversely extending rod means joined to each of said upright shafts positioned thereon to selectively seat in said slanted slots in said side sections, movable abutment fittings on said transverse rods, a flat sheet member having means to support same relative to said transverse rods, a plurality of line indicia on said sheet member, said rack adapted in use to support record albums having spaced aperture means with said transverse rods positioned in the aperture means in supporting engagement, and with said sheet member serving as an indexing means for said records and record albums stored therein.

4. A record and enclosure holder comprising, a rectangular shaped base, an upright support secured to the rear of said base having two opposed upright side sections joined to said base at the bottom thereof and having a plurality of slots on the front edges thereof, a top header means on said upright support having a plurality of spaced apertures therein, said base having a plurality of apertures therein opposite the apertures in said header means, a plurality of upright shafts mounted in said apertures in said header means and said base, a plurality of transversely extending rods on each of said shafts positioned to selectively engage at the outer ends said slots in said side sections of said upright support, movable abutment fittings on said transversely extending rods, said holder adapted in use to support record enclosure means with said transversely extending rods in supporting engagement in said aperture means.

5. The structure of claim 4 wherein means securable to said enclosure means to support same on said extending rods is provided comprised of, an elongated metal member having a transverse U-shaped cross section, inwardly directed pointed projections on each of the legs of said U-shaped member, and spaced hangers mounted on said member each hanger comprised of a rectangular-shaped element having an upwardly directed hook shaped slot therein, said means to support adapted to be secured to the edge of a record enclosure by bending the legs of the U-shaped member together in engagement with an edge of said enclosure.

6. The structure of claim 4 wherein means securable to said enclosure means to support same on said extending rods is provided comprised of, an elongated member having a transverse U-shaped cross section, an extending flange portion depending from the base of said U-shaped member having spaced apertures therein, said means adapted to be secured to the edge of a record enclosure by bending the legs of the U-shaped member in frictional engagement with an edge of said enclosure.

7. A record and enclosure means rack comprising, a base, an upright support secured to said base, said upright support having two opposed upright side sections having slots in the front edges thereof, means depending from said upright support having a plurality of spaced apertures therein, said base being provided with a plurality of spaced apertures, a plurality of generally upright shafts mounted in said apertures in said base and in said means depending from said upright support, and transversely extending rods on said shafts positioned to selectively engage said slots in said upright support, said rack adapted in use to support records and enclosure means therefor having means thereon to engage said transverse rods in supporting relationship.

8. A record and enclosure means holder comprising, a plurality of vertically spaced horizontally extending elongated members, means for supporting said horizontally extending elongated members comprising, a base, an upright member secured to the rear of said base, and upright shaft means mounted on said base and said upright means and connected in supporting engagement to said horizontally extending elongated members, said holder adapted to support enclosure means and records therein when mounted on said elongated members.

9. A record and enclosure means holder comprising, a plurality of vertically spaced horizontally extending members, means for supporting said horizontally extending members comprising, base means constructed and adapted to rest said record and enclosure means, support means secured to the rear portion of said base means and extending upwardly therefrom, said support means having spaced upright support members disengagingly connecting in supporting engagement said horizontally extending members, said holder constructed and adapted to support enclosure means and records therein when mounted on said horizontally extending members.

References Cited by the Examiner

UNITED STATES PATENTS

| | | | |
|---|---|---|---|
| 818,130 | 4/1906 | Swan | 129—18 |
| 1,878,177 | 9/1932 | Redersen | 211—45 |
| 2,482,572 | 9/1949 | Auigdor | 312—12 |
| 2,587,269 | 2/1952 | Yerkes | 312—10 |
| 2,983,387 | 5/1961 | Klein | 211—40 |
| 3,092,256 | 6/1963 | Vernik | 211—40 |
| 3,100,671 | 8/1963 | Atkins | 312—14 |

FOREIGN PATENTS

| | | |
|---|---|---|
| 927,596 | 5/1963 | Great Britain. |
| 8,369 | 11/1899 | Norway. |

CLAUDE A. LE ROY, *Primary Examiner.*

J. F. FOSS, *Assistant Examiner.*